(12) United States Patent
Tsai et al.

(10) Patent No.: US 12,540,912 B2
(45) Date of Patent: Feb. 3, 2026

(54) ELECTRODE ASSEMBLY OF PH METER

(71) Applicant: Luh Cherng Enterprise Co., Ltd., Kaohsiung (TW)

(72) Inventors: Wen-Feng Tsai, Kaohsiung (TW); Ke-Fu Lin, Kaohsiung (TW); Shu-Wei Hsu, Kaohsiung (TW)

(73) Assignee: LUH CHERNG ENTERPRISE CO., LTD., Kaohsiung (TW)

( * ) Notice: Subject to any disclaimer, the term of this patent is extended or adjusted under 35 U.S.C. 154(b) by 205 days.

(21) Appl. No.: 18/619,997

(22) Filed: Mar. 28, 2024

(65) Prior Publication Data

US 2025/0305980 A1 Oct. 2, 2025

(51) Int. Cl.
| | |
|---|---|
| *G01N 27/30* | (2006.01) |
| *G01N 27/333* | (2006.01) |
| *G01N 27/403* | (2006.01) |
| *G01N 27/416* | (2006.01) |

(52) U.S. Cl.
CPC ......... *G01N 27/302* (2013.01); *G01N 27/333* (2013.01); *G01N 27/4035* (2013.01); *G01N 27/4167* (2013.01)

(58) Field of Classification Search
CPC ............. G01N 27/302; G01N 27/4167; G01N 27/4035; G01N 27/333
See application file for complete search history.

(56) References Cited

U.S. PATENT DOCUMENTS

4,112,352 A 9/1978 Barben, II

*Primary Examiner* — Alexander S Noguerola
(74) *Attorney, Agent, or Firm* — ALLEN, DYER, DOPPELT, + GILCHRIST, P.A.

(57) ABSTRACT

An electrode assembly of a pH meter includes a plurality of ion barrier units and electrolyte retaining units that are arranged along a central axis. Each ion barrier unit includes an impermeable substrate, a transport ring, and an impermeable cover. The substrate has a receiving cavity, and a first side aperture with a first dowel inserted therein. The transport ring is disposed within the receiving cavity and is liquid permeable. The cover is disposed over and seals an opening of the receiving cavity, and has a second side aperture penetrating the cover, and a second dowel inserted into the second side aperture. The electrolyte retaining units are each disposed between two successive ion barrier units and are permeable. A sensing electrode penetrates through the ion barrier units and the electrolyte retaining units along the central axis.

7 Claims, 7 Drawing Sheets

ELECTRODE ASSEMBLY OF PH METER

FIELD

The disclosure relates to a component of a pH meter, and more particularly to a reference electrode assembly of a pH meter.

BACKGROUND

Figure 1:
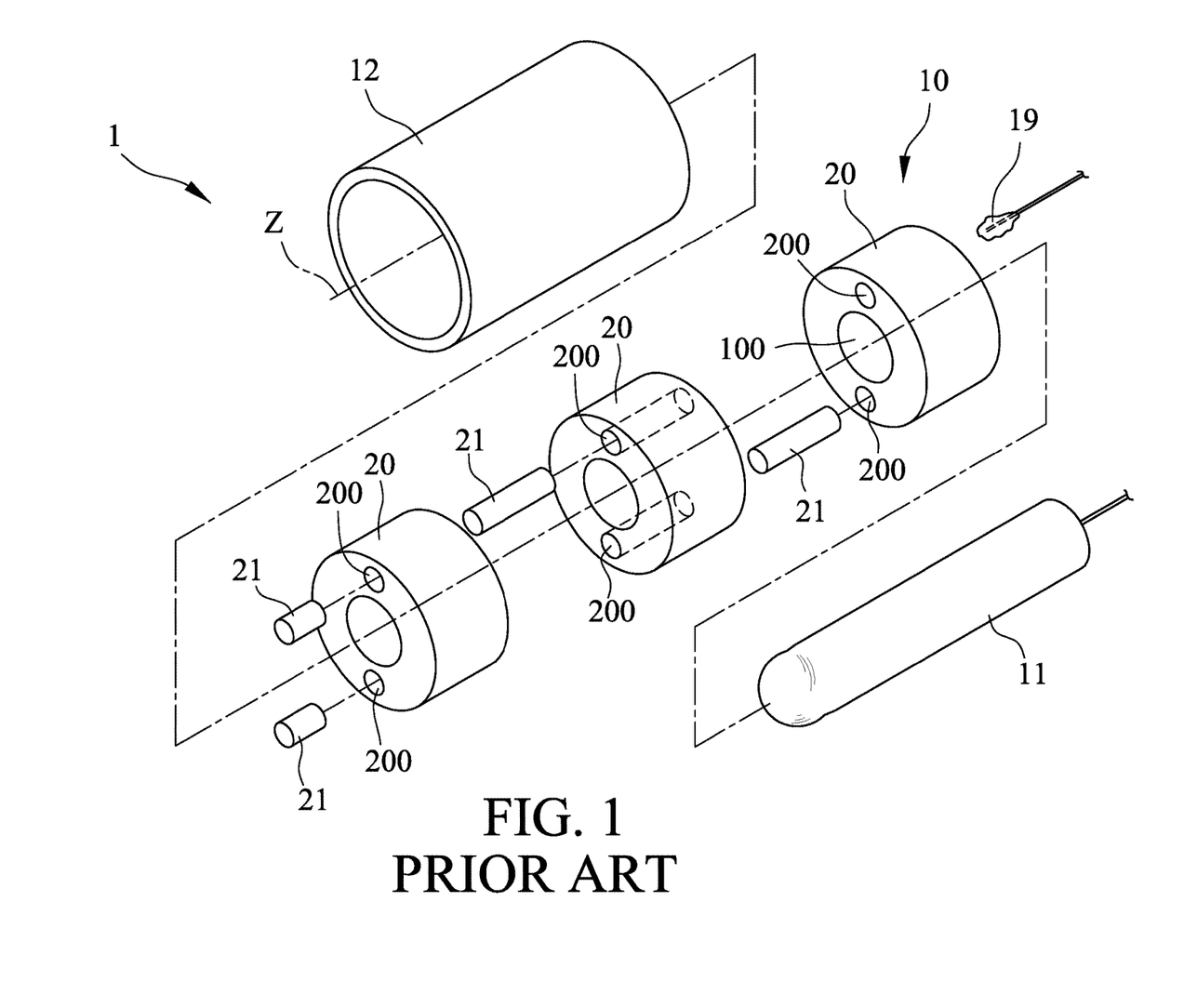
FIG. 1 is a three-dimensional exploded view illustrating a conventional electrode assembly.
Figure 2:
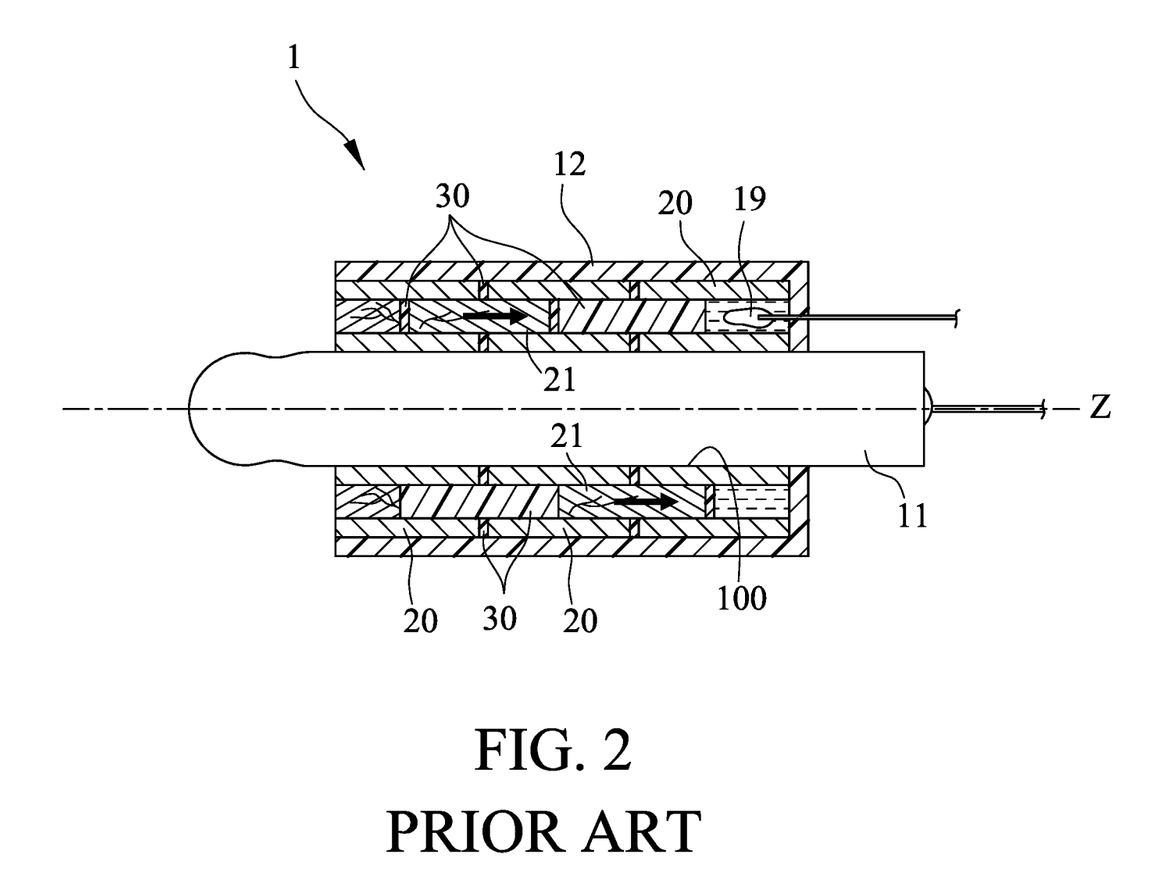
FIG. 2 is a cross-sectional view illustrating the conventional electrode assembly during measurement.

Referring to FIG. 1, U.S. Pat. No. 4,112,352 A discloses a conventional reference electrode assembly 1 used for measuring a pH value of a sample fluid. The reference electrode assembly 1 includes an internal assembly 10 surrounding a penetration passage along a direction parallel to a central axis (Z), a glass sensing electrode 11 penetrated through the penetration passage, and a housing 12 sleeved around the internal assembly 10. Referring to FIGS. 1 and 2, the internal assembly 10 includes a plurality of toroidal plugs 20, a plurality of dowels 21, and a plurality of sealants 30. The plurality of toroidal plugs 20, each surrounding a central bore 100 along the direction parallel to the central axis (Z), are capable of being impregnated in an electrolyte and containing conductive ions. Each of the dowels 21 is provided for an interconnection and a fluid communication between two adjacent ones of the toroidal plugs 20. The plurality of sealants 30 are respectively coated on interior transverse surfaces of the plurality of toroidal plugs 20 and the plurality of dowels 21 to form fluid type seals between the two adjacent ones of the toroidal plugs 20 and two adjacent ones of the dowels 21. Each of the toroidal plugs 20 has two side apertures 200 penetrating therethrough along the direction parallel to the central axis (Z) for insertion of the dowels 21 and/or filling with the sealant 30. To be specific, in each of the toroidal plugs 20, at least one of the side apertures 200 is penetrated by one of the dowels 21. By virtue of the characteristic of the dowels 21 having fiber pores so as to be impregnated in the electrolyte, such dowels 21 are capable of retaining the conductive ions and cooperate with the toroidal plugs 20 to form an electrical pathway for transferring hydrogen ions of the sample fluid.

Referring to FIG. 2, since the plurality of toroidal plugs 20 are bonded to each other with the sealants 30 that is ion-impermeable, and the plurality of dowels 21 are fluidly isolated in the direction parallel to the central axis (Z) by the sealant 30, transfer of ions from one of the toroidal plugs 20 can only be proceeded through the corresponding dowel 21 to the next toroidal plug 20. Further, each dowel 21 is inserted into two aligned side apertures 200 in two successive toroidal plugs 20, and is fluidly isolated from the other dowels 21 in the direction parallel to the central axis (Z) by filling the sealants 30 in the side apertures 200. Therefore, when ions are transferred between two successive dowels 21 which are respectively located on two transversely opposite sides of the glass sensing electrode 11, the ions are only allowed to transversely pass through the capillaries of overlapping parts of the toroidal plugs 20. In this way, when the electrode assembly 1 performs measurements, an alternate placement of the dowels 21 can thus form a meandering pathway for ion transfer, thereby preventing a rapid loss of the conductive ions from the electrolyte, delaying a time point where a reference electrode 19 (Ag/AgCl) would eventually be poisoned by impurities, and extending a service life of the electrode assembly 1.

However, assembly of the electrode assembly 1 requires the use of the sealants 30. Typically, each of the sealants 30 is generally an epoxy resin that requires waiting for the epoxy resin to dry and cure from an initial flowable liquid state to a final solidified state. During an assembly process, using the sealant 30 while it is still in the flowable liquid state and not yet dried may make it challenging to ensure its final shape after drying and curing. Therefore, an improperly coated amount of the sealant 30 or an underestimation of a change in configuration after drying and curing may result in issues like residual gaps between the two adjacent ones of the toroidal plugs 20 that are still interconnected, or a failure to form effective isolation of the dowels 21 in the direction parallel to the central axis (Z), thereby adversely affecting an assembly yield. In addition, during the assembly process, the sealant 30 used in the previous step requires waiting to dry and cure before proceeding to the next step, thus resulting in a less efficient operation.

Figure 3:
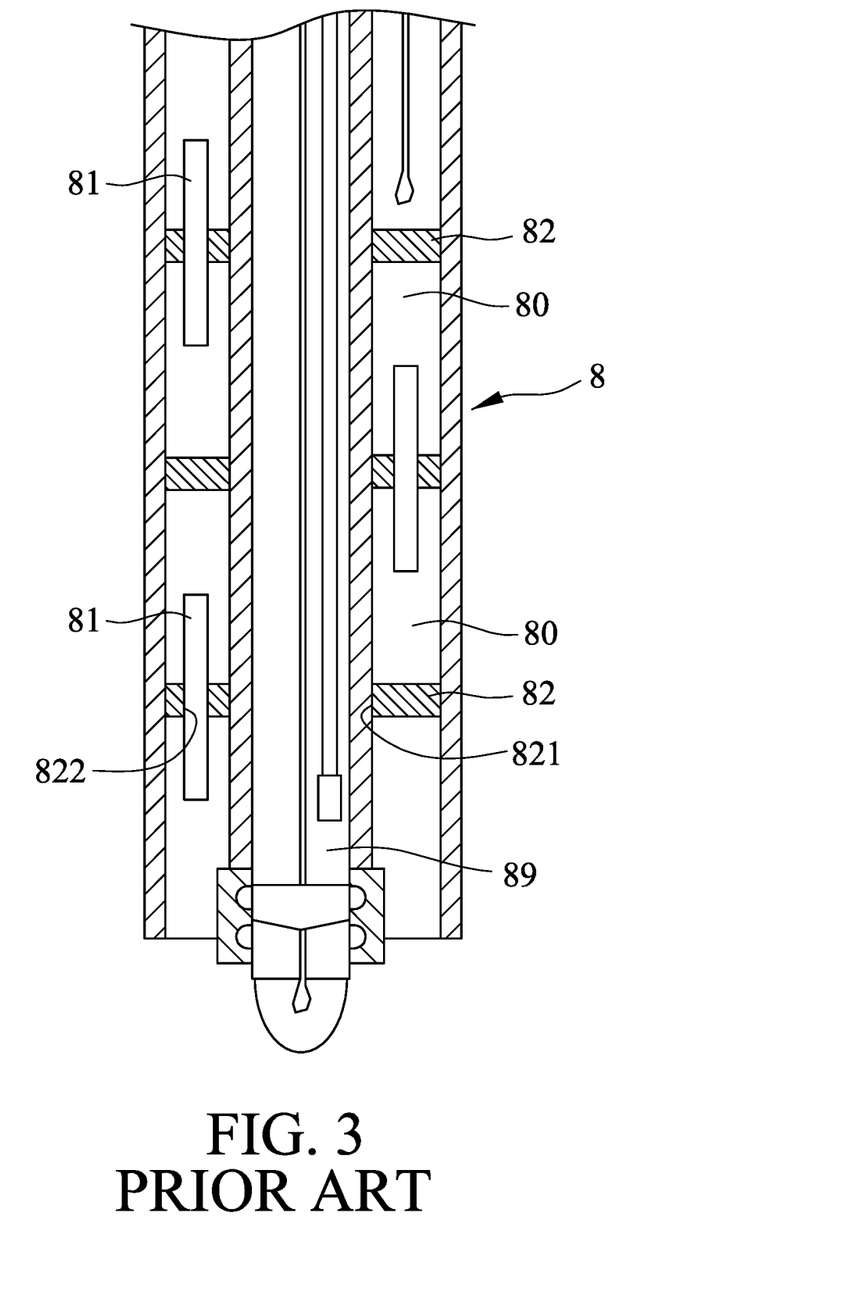
FIG. 3 is a partially cross-sectional view illustrating another conventional electrode assembly.

Referring to FIG. 3, another conventional electrode assembly 8 is provided. In order to overcome the issues of assembly with the sealants 30 as shown in FIGS. 1 and 2, although the electrode assembly 8 also uses a plurality of dowels 81 to form a meandering pathway for ion transfer, the plurality of dowels 81 are assembled with a plurality of toroidal plugs 80 using a plurality of assembly pieces 82 separated from each other. To be specific, the plurality of assembly pieces 82 define a penetration passage 821 for a penetration of a glass sensing electrode 89 in the center, and each of the assembly pieces 82 has a side aperture 822 radially spaced from the penetration passage 821 for being penetrated by of one of the dowels 81. The plurality of dowels 81 are respectively penetrated through a plurality of side apertures 822 of the plurality of assembly pieces 82, and then the plurality of toroidal plugs 80 and the plurality of assembly pieces 82 are stacked on each other, so as to complete an assembly process of the electrode assembly 8.

In this electrode assembly 8, the electrode assembly 8 is assembled without using a sealant. However, due to the absence of an immediate bonding and joining effect of the sealant, the toroidal plugs 80 and the assembly pieces 82 are stacked one by one without any preliminary positioning mechanism for preliminarily positioning the toroidal plugs 80 and the assembly pieces 82 relative to each other, and hence the assembly process is not convenient and there remains a potential for loosening after assembly.

Therefore, how to provide an electrode assembly which not only can be assembled reliably and efficiently but also has an extended service life is a crucial technical challenge for a skilled artisan.

SUMMARY

Therefore, an object of the disclosure is to provide an electrode assembly of a pH meter that can alleviate at least one of the drawbacks of the prior art.

According to the disclosure, the electrode assembly of a pH meter includes a plurality of ion barrier units, a plurality of electrolyte retaining units, and a sensing electrode. The plurality of ion barrier units are spaced apart from each other and are arranged along a central axis. Each of the ion barrier units surrounds a first central bore that is centered along the central axis, and includes a substrate, a transport ring, and a cover. The substrate is impermeable, surrounds the first central bore, and has a receiving cavity angularly extending around and radially spaced apart from the first central bore and having an opening to open in a direction parallel to the central axis. The substrate further has a cavity boundary wall disposed at a side of said receiving cavity oppositely of the opening and transversely of the central axis, at least one first side aperture penetrating the cavity boundary wall, and at least one first dowel inserted into the at least one first side aperture. The transport ring is disposed within the receiving cavity and is made of a liquid permeable material. A transport speed of the transport ring for ions along a transverse plane, which is perpendicular to the central axis, is greater than a transport speed of the transport ring for the ions along the direction parallel to the central axis. The cover is impermeable, is disposed over the opening to seal the receiving cavity, and has a second side aperture penetrating the cover, and a second dowel inserted into the second side aperture. The at least one first side aperture in the substrate of each of the ion barrier units is not aligned with the at least one first side aperture in the substrate of a successive one of the ion barrier units along the direction parallel to the central axis. The plurality of electrolyte retaining units are each disposed between two successive ones of the ion barrier units and are made of a material capable of retaining conductive ions by impregnation with an electrolyte. Each of the electrolyte retaining units surrounds a second central bore centered along the central axis. The first central bores of the ion barrier units and the second central bores of the electrolyte retaining units cooperatively form a penetration passage. The sensing electrode is inserted into the penetration passage.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
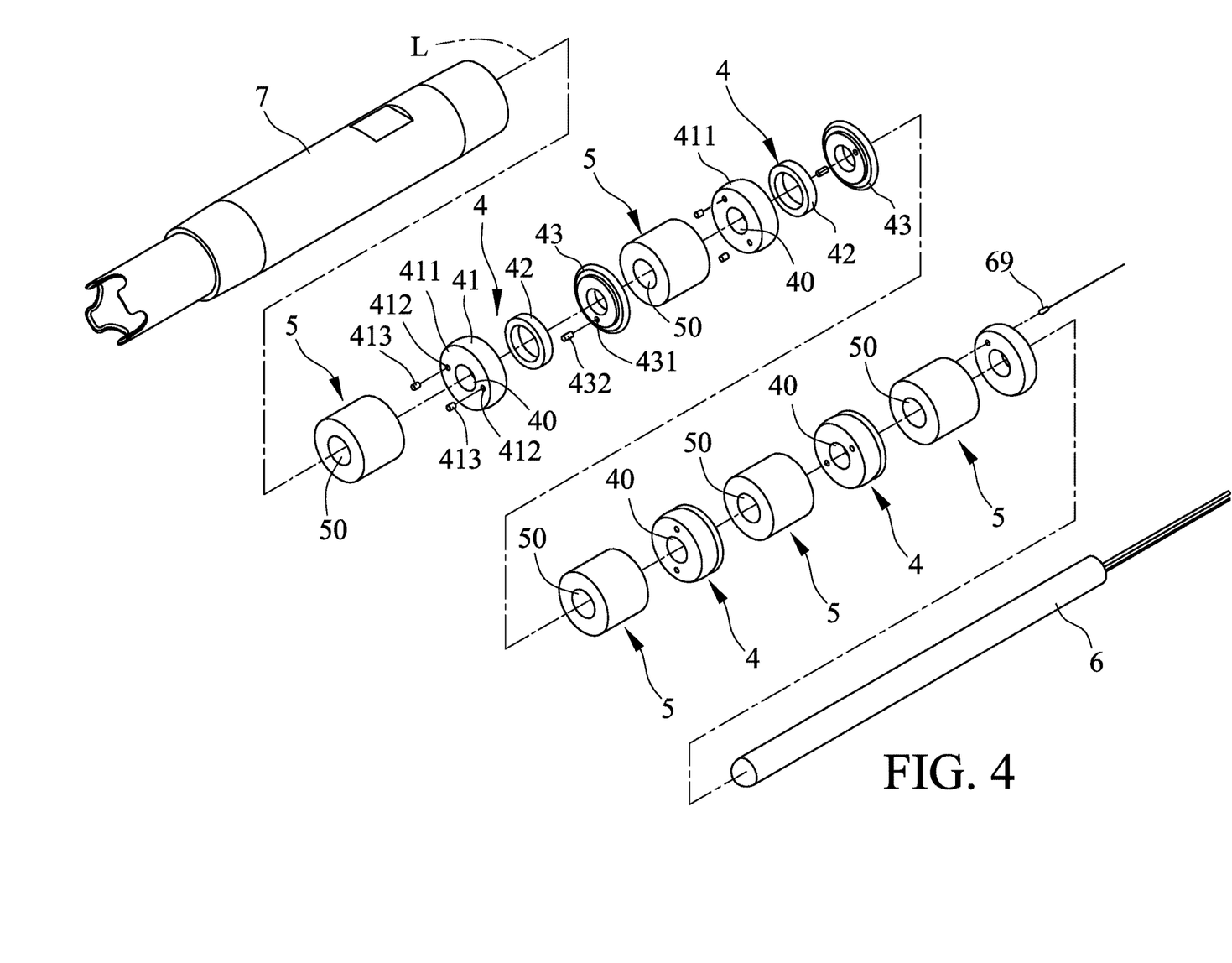
FIG. 4 is a three-dimensional exploded view illustrating an embodiment of an electrode assembly of a pH meter according to the present disclosure.
Figure 5:
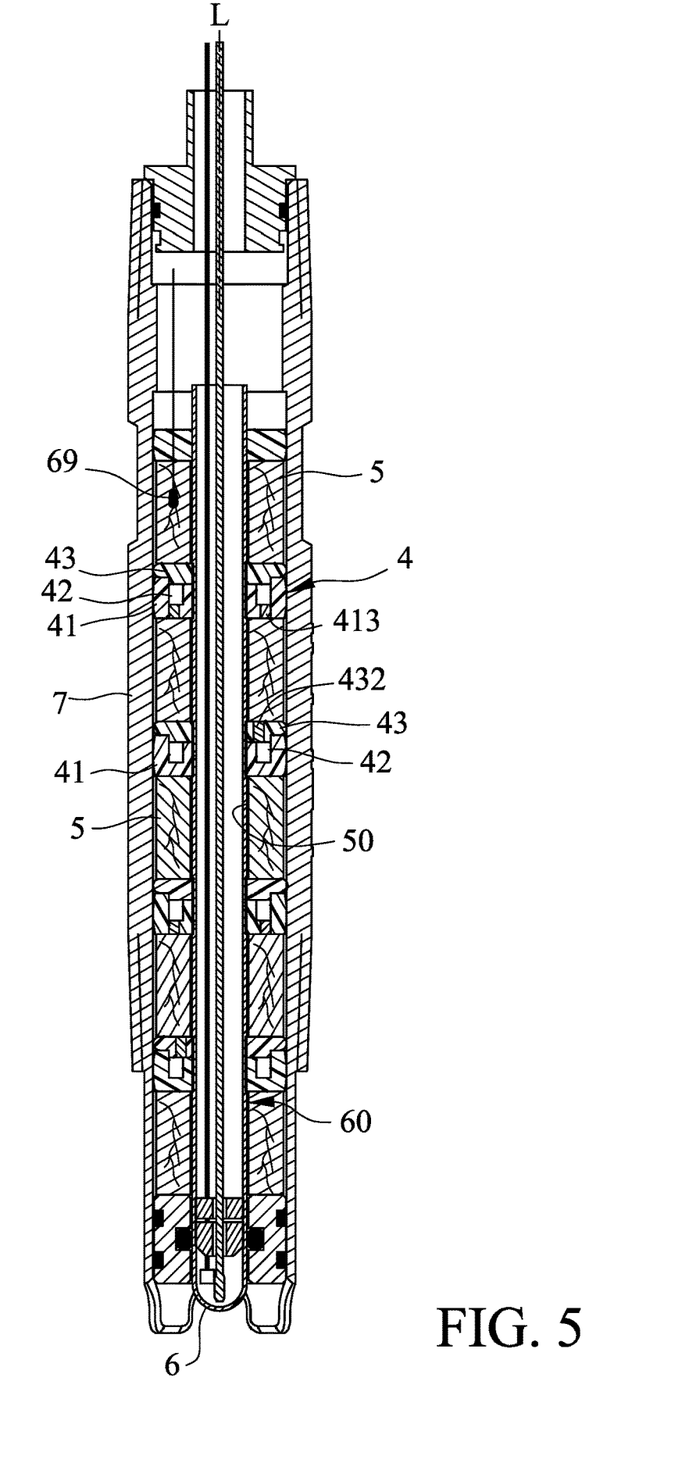
FIG. 5 is a cross-sectional view illustrating an interconnection of a plurality of ion barrier units and a plurality of electrolyte retaining units of the embodiment.

Referring to FIGS. 4 and 5, an embodiment of an electrode assembly (i.e., a reference electrode assembly) of a pH meter according to the present disclosure includes a plurality of ion barrier units 4 that are spaced apart from each other and are arranged along a central axis (L), a plurality of electrolyte retaining units 5 each being disposed between two successive ones of the ion barrier units 4, a sensing electrode 6, and a housing 7 that is sleeved around the ion barrier units 4 and the electrolyte retaining units 5. In particular, each of the ion barrier units 4 surrounds a first central bore 40 centered along the central axis (L), and each of the electrolyte retaining units 5 surrounds a second central bore 50 centered along the central axis (L). Therefore, the first central bores 40 of the ion barrier units 4 and the second central bores 50 of the electrolyte retaining units 5 cooperatively form a penetration passage 60. The sensing electrode 6 is made of glass and is inserted into the penetration passage 60, so as to cooperate with a reference electrode 69 which is usually made of silver or silver chloride. When hydrogen ions from a sample fluid are transported through the plurality of ion barrier units 4 and the plurality of electrolyte retaining units 5, a potential difference between the sensing electrode 6 and the reference electrode 69 may be measured and converted into a corresponding pH valve of the sample fluid by the pH meter.

Figure 6:
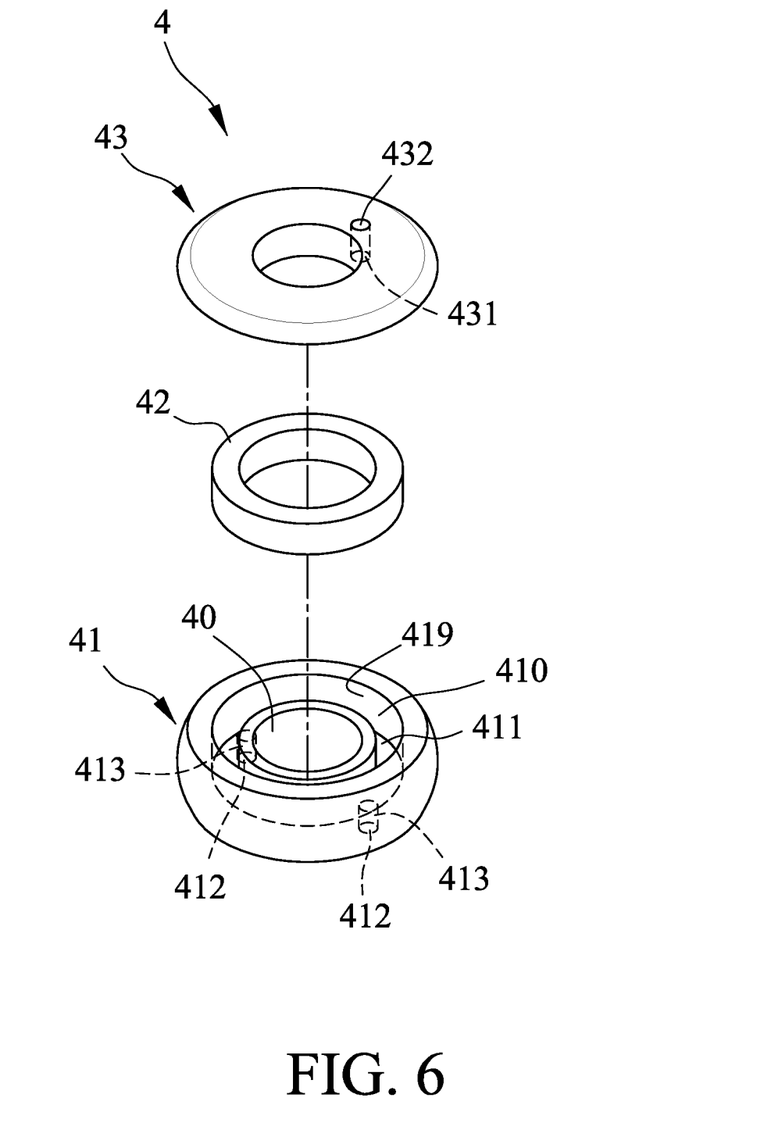
FIG. 6 is a three-dimensional exploded view illustrating a substrate, a transport ring, and a cover of each of the ion barrier units of the embodiment.

Referring to FIG. 6 in conjunction with FIG. 5, each of the ion barrier units 4 includes a substrate 41 that is impermeable, surrounds the first central bore 4 and has a receiving cavity 410 angularly extending around and radially spaced apart from the first central bore 40, and having an opening 419 that opens in a direction parallel to the central axis (L). The substrate 41 further has a cavity boundary wall 411 disposed at a side of the receiving cavity 410 oppositely of the opening 419 and transversely of the central axis (L), at least one first side aperture 412 penetrating the cavity boundary wall 411, and at least one first dowel 413 inserted into the at least one first side aperture 412. Each of the ion barrier units 4 further includes a transport ring 42 that is disposed within the receiving cavity 410 and is made of a liquid permeable material, and a cover 43 that is impermeable and is disposed over the opening 419 to seal the receiving cavity 410. In this embodiment, the at least one first side aperture 412 of the substrate 41 has two first side apertures 412 penetrating the cavity boundary wall 411 and respectively disposed on two sides of the first central bore 40 that are opposite in a direction perpendicular to the central axis (L), and the at least one first dowel 413 has two first dowels 413 respectively inserted into the two first side apertures 412. Therefore, when the sample fluid and its ions are transported from one side of the cavity boundary wall 411 of each ion barrier unit 4 to the transport ring 42 at the other opposite side where an electrolyte is absorbed, the ions from the sample fluid are able to pass through a mere pathway formed by the first dowels 413.

In some embodiments, the liquid permeable material of the transport ring 42 of each of the ion barrier units 4 is pulp. After the pulp is impregnated in the electrolyte, such as potassium chloride solution, the transport ring 42 is able to expand within the corresponding receiving cavity 410 due to absorption of the electrolyte and abut against the inner wall surface of the substrate 41. This ensures that the transport ring 42 is completely filled in the corresponding receiving cavity 410 and is stably accommodated in each of the ion barrier units 4, and provides a pathway limiting effect that limits generation of undesirable pathways formed by unintendedly created crevices that will cause the electrolyte to unintentionally flow therethrough. A transport speed of the transport ring 42 for ions along a transverse plane, which is perpendicular to the central axis (L), is greater than a transport speed of the transport ring 42 for the ions along the direction parallel to the central axis (L).

It should be noted that in the case of the sample fluid being a strong in alkaline solution, if the liquid permeable material of the transport ring 42 of each of the ion barrier units 4 is pulp, fibers in the pulp may prevent the transport ring 42 from being liquefied upon contact with the strong alkaline solution, thereby avoiding an adverse effect to a fundamental measurement performance. The pulp is formed with a plurality of fiber grain textures extending in the transport ring 42 along the transverse plane, so that the transport speed of the transport ring 42 for the ions along the transverse plane is greater than the transport speed of the transport ring 42 for the ions along the direction parallel to the central axis (L). Furthermore, the pulp may be designed into a disorganized fiber orientation to slow down the transport speed of the transport ring 42, thereby controlling the transport speed of the transport ring 42 and delaying transport of impurities from the sample fluid.

In some embodiments, the cover 43 of each of the ion barrier units 4 is made of fluorine rubber. In an exemplary embodiment, the cover 43 of each of the ion barrier units 4 is made of VITON which is resistant to acids and alkalis. The cover 43 of each of the ion barrier units 4 has a second side aperture 431 penetrating the cover 43, and a second dowel 432 inserted into the second side aperture 431. Therefore, when the sample fluid and its ions are transported forward from the transport ring 42 of each of the ion barrier units 4, they pass through the cover 43 via a mere pathway formed by the second dowel 432.

In some embodiments, the plurality of electrolyte retaining units 5 are made of a material capable of retaining conductive ions by impregnation with the electrolyte. In an exemplary embodiment, the material of each of the electrolyte retaining units 5 is wood which is capable of being formed into a desired shape and of being impregnated with the electrolyte. Particularly, each of the electrolyte retaining units 5 has a hollow cylindrical wooden body that is disposed between two successive ones of the ion barrier units 4, and that has two axially opposite sides respectively abutting against the first dowels 413 in the substrate 41 of one of the ion barrier units 4 and the second dowel 432 in the cover 43 of the successive other one of the ion barrier units 4.

The plurality of electrolyte retaining units 5 are previously impregnated in the electrolyte, such as the potassium chloride solution, such that the sample fluid and its ions are permitted to be smoothly transported. In addition, after the plurality of electrolyte retaining units 5 are impregnated in the electrolyte, such plurality of electrolyte retaining units 5 will be slightly expanded due to an absorption of the electrolyte. Therefore, in this embodiment, because the outer surfaces of the electrolyte retaining units 5 abut against the inner surface of the housing 7, the electrolyte retaining units 5 are able to expand only along the direction parallel to the central axis (L), so that each ion barrier unit 4 is held tightly between two successive electrolyte retaining units 5, and a tight interconnection among the ion barrier units 4 and the electrolyte retaining units 5 is achieved.

Figure 7:
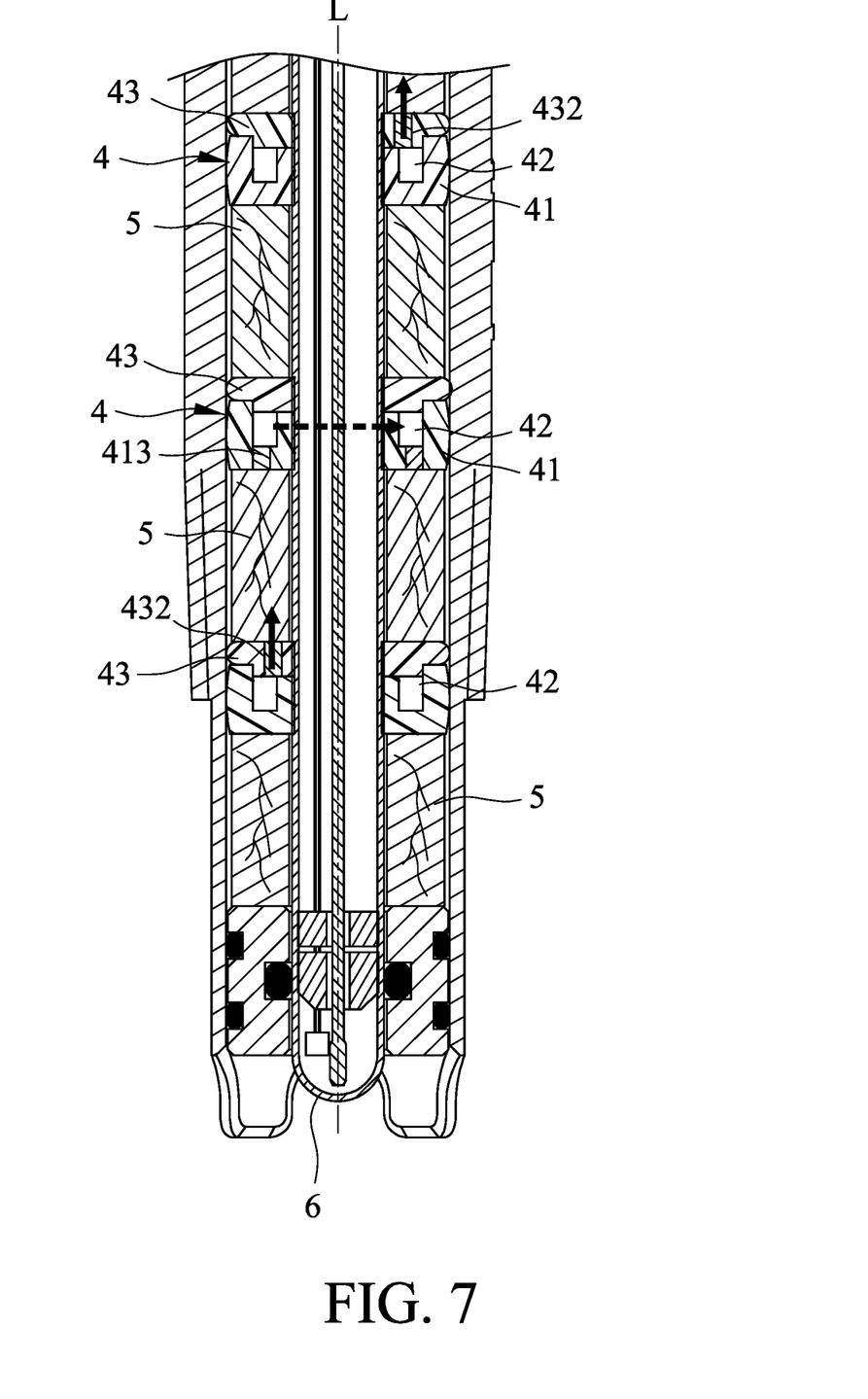
FIG. 7 is a schematic view illustrating a spirally winding pathway in which ions are transported through the plurality of ion barrier units and the plurality of electrolyte retaining units of the embodiment.

Referring FIG. 7 in conjunction with FIG. 4, after the electrode assembly of the pH meter according to the present disclosure is immersed in the sample fluid, the sample fluid and its ions are gradually transported upward along a portion of the electrode assembly that has been previously impregnated with the electrolyte (e.g., the potassium chloride solution) and contains the conductive ions from the electrolyte. During transport, the sample fluid and its ions are only able to be transported along a pathway collectively formed by the plurality of electrolyte retaining units 5, and the plurality of first dowels 413, the plurality of transport ring 42, and the plurality of second dowels 432 of the plurality of ion barrier units 4. In addition, in this embodiment, the two first side apertures 412 in the substrate 41 of each of the ion barrier units 4 are not aligned with the two first side apertures 412 in the substrate 41 of a successive one of the ion barrier units 4 along the direction parallel to the central axis (L). In each of the ion barrier units 4, the two first side apertures 412 in the substrate 41 are not aligned with the second side aperture 431 in the cover 43 along the direction parallel to the central axis (L). Therefore, a pathway from the two first dowels 413 to the second dowel 432 via the transport ring 42 in each of the ion barrier units 4, and a pathway from the previous ion barrier unit 4 to the next ion barrier unit 4 via the electrolyte retaining unit 5 are not parallel to the central axis (L) and are longer than a shortest pathway which is parallel to the central axis (L). Particularly, the aforesaid pathways constitute a longer spirally winding pathway with multiple bends that turn almost perpendicularly.

According to the present disclosure as shown in FIGS. 5 and 7, in addition to using wooden components such as the plurality of first dowels 413, the plurality of second dowels 432, and the plurality of electrolyte retaining units 5 to filter the impurities that may adversely affect the conductive ions from the electrolyte (e.g., the potassium chloride solution), the spirally winding pathway collectively formed by the plurality of first dowels 413 and the plurality of second dowels 432 can provide a prolonged transport pathway for transporting the sample fluid and the impurities therein, compared to the shortest pathway parallel to the central axis (L). Furthermore, the spirally winding pathway collectively formed by the plurality of ion barrier units 4 and the plurality of electrolyte retaining units 5 can achieve the effects of limiting generation of undesirable flow paths and screening out the impurities, so that a loss of the conductive ions of the potassium chloride solution resulting from neutralization with the ions from the sample fluid may be reduced, and fouling of the reference electrode which is made of silver or silver chloride may be delayed, thereby effectively extending a service life of the electrode assembly of the present disclosure and ensuring a more accurate measurement to increase reliability of the actual measurement.

It should be noted that during an assembly process of the electrode assembly of the present disclosure, the plurality of first dowels 413 and the plurality of second dowels 432 are inserted into the corresponding first side apertures 412 and the corresponding second side apertures 431, respectively, without the need of a sealant. The plurality of ion barrier units 4 and the electrolyte retaining units 5 are stacked by simply interposing each electrolyte retaining unit 5 between two ion barrier units 4 and by sleeving the housing 7 around the radially outer surface of the ion barrier units 4 and the electrolyte retaining units 5. Hence, the assembly process can be completed easily and efficiently while still dispensing with the use of the sealant.

In summary, the embodiment of the electrode assembly of the pH meter according to the present disclosure can not only provide an effective and simple assembly of the electrode assembly, but also provide the spirally winding pathway collectively formed by the plurality of first dowels 413 and the plurality of second dowels 432 of the plurality of ion barrier units 4 cooperating with the plurality of transport rings 42 for transporting the sample fluid and its ions. Thus, the loss of the conductive ions of the impregnating electrolyte may be reduced and hence the service life of the electrode assembly of the pH meter may be prolonged.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrode assembly of a pH meter, comprising:
   a plurality of ion barrier units that are spaced apart from each other and are arranged along a central axis, each of said ion barrier units surrounding a first central bore that is centered along said central axis, and including
   a substrate that is impermeable, that surrounds said first central bore, and that has a receiving cavity which angularly extends around and is radially spaced apart from said first central bore, and which has an opening to open in a direction parallel to said central axis, said substrate further having a cavity boundary wall disposed at a side of said receiving cavity oppositely of said opening and transversely of said central axis, at least one first side aperture penetrating said cavity boundary wall, and at least one first dowel inserted into said at least one first side aperture,
   a transport ring that is disposed within said receiving cavity and is made of a liquid permeable material, a transport speed of said transport ring for ions along a transverse plane, which is perpendicular to said central axis, being greater than a transport speed of said transport ring for the ions along the direction parallel to said central axis, and
   a cover that is impermeable, that is disposed over said opening to seal said receiving cavity, and that has a second side aperture penetrating said cover, and a second dowel inserted into said second side aperture,
   wherein said at least one first side aperture in said substrate of each of said ion barrier units is not aligned with said at least one first side aperture in said substrate of a successive one of said ion barrier units along the direction parallel to said central axis;
   a plurality of electrolyte retaining units each disposed between two successive ones of said ion barrier units and being made of a material capable of retaining conductive ions by impregnation with an electrolyte, each of said electrolyte retaining units surrounding a second central bore centered along said central axis, said first central bores of said ion barrier units and said second central bores of said electrolyte retaining units cooperatively forming a penetration passage; and
   a sensing electrode that is inserted into said penetration passage.

2. The electrode assembly of the pH meter as claimed in claim 1, wherein in each of said ion barrier units, said at least one first side aperture in said substrate is not aligned with said second side aperture in said cover along the direction parallel to said central axis.

3. The electrode assembly of the pH meter as claimed in claim 1, wherein said at least one first side aperture includes two first side apertures, said at least one first dowel includes two first dowels, said two first side apertures are respectively disposed on two sides of said first central bore that are opposite in a direction perpendicular to said central axis, and said two first dowels are respectively inserted into said two first side apertures.

4. The electrode assembly of the pH meter as claimed in claim 1, wherein the liquid permeable material of said transport ring of each of said ion barrier units is pulp, the pulp having fiber grain textures extending in said transport ring along the transverse plane.

5. The electrode assembly of the pH meter as claimed in claim 1, wherein said cover of each of said ion barrier units is made of fluorine rubber.

6. The electrode assembly of the pH meter as claimed in claim 1, wherein the material of each of said electrolyte retaining units is wood.

7. The electrode assembly of the pH meter as claimed in claim 1, wherein each of the electrolyte retaining units has a hollow cylindrical wooden body that is disposed between two successive ones of said ion barrier units, and that has two axially opposite sides respectively abutting against said at least one first dowel of one of two successive ones of said ion barrier units and said at least one second dowel of the other one of two successive ones of said ion barrier units.

\* \* \* \* \*